United States Patent Office 3,351,671
Patented Nov. 7, 1967

3,351,671
PREPARATION OF PENTAFLUOROIODOETHANE
Louis G. Anello, Basking Ridge, and Richard F. Sweeney, Randolph Township, Morris County, N.J., assignors to Allied Chemical Corporation, New York, N.Y., a corporation of New York
No Drawing. Filed May 5, 1966, Ser. No. 547,765
2 Claims. (Cl. 260—653.8)

This is a continuation-in-part of our application Ser. No. 466,442, filed June 23, 1965, now abandoned. The invention relates to a simplified and economical process for preparing pentafluoroiodoethane. Pentafluoroiodoethane is a well known, valuable telogen which can be reacted with tetrafluoroethylene to form perfluoroalkyl iodides, which in turn may be converted to perfluorocarboxylic acids, useful as emulsifiers and as intermediates for the synthesis of a variety of textile stain repellents.

Because of its value as an intermediate, the prior art has gone to considerable lengths to develop methods for producing pentafluoroiodoethane. Banks et al., in J. Chem. Soc. (1948) p. 2188, first described the preparation of pentafluoroiodoethane by fluorinating tetraiodoethylene with iodine pentafluoride. An improved method involved the fluorination of diiodotetrafluoroethane with iodine pentafluoride. (Emeleus et al., J. Chem. Soc. (1949), p. 2948.) Other methods employing iodine pentafluoride involved reacting tetrafluoroethylene with an iodine-iodine pentafluoride mixture (British Patent 885,007) and conducting the iodine-iodine pentafluoride and tetrafluoroethylene reaction in the presence of various metal fluorides (U.S.P. 3,132,185 to Parsons). The above methods suffer from the disadvantages of requiring the use of iodine pentafluoride which is an expensive reagent and is also very toxic and difficult to handle. Other methods devised for the preparation of pentafluoroiodoethane include—reacting iodine with tetrafluoroethylene in the presence of a fluoride of an alkali metal (U.S.P. 3,052,732 to Krespan); the reaction of either 1,2-diiodotetrafluoroethane or tetrafluoroethylene with iodine, sulfur tetrafluoride and hydrogen fluoride at superatmospheric pressures (U.S.P. 3,072,730 to Twelves); reacting 1,2-diiodotetrafluoroethane with mercuric oxide and hydrogen fluoride (U.S.P. 3,133,125 to Drysdale et al.) and reacting tetrafluoroethylene, mercuric oxide, hydrogen fluoride and iodine in certain mole ratios (U.S.P. 3,140,320 to Weinmayr). All of these processes suffer from one or more of the disadvantages of being uneconomical, involving the handling of toxic materials, requiring the use of superatmospheric pressures and the high pressure equipment required therein, close regulation of a number of reaction conditions and the use of a number of reactants and catalysts.

We have found that pentafluoroiodoethane can be efficiently and economically prepared at atmospheric pressure by a simple, noncatalytic process comprising reacting only two basic ingredients, viz., diiodotetrafluoroethane and antimony trifluorodichloride ($SbF_3Cl_2$) at certain temperatures.

$SbF_3Cl_2$ is a conventional fluorinating agent which has been used extensively for effecting the replacement of halogen atoms other than fluorine, by fluorine atoms. Its capability, however, for preparing pentafluoroiodoethane from 1,2-diiodotetrafluoroethane is reasonably good yields, in a one step, noncatalytic reaction as described above has not been thus far appreciated, as evidenced by the fact that the instant specific reaction with $SbF_3Cl_2$ has not been disclosed and also by the substantially more complicated and expensive procedures which have been devised by the prior art to prepare this valuable product, as discussed heretofore. The reason for the failure of the workers skilled in this art to appreciate the feasibility and value of the specific reaction of 1,2-diiodotetrafluoroethane with $SbF_3Cl_2$ to form pentafluoroiodoethane is due to the fact that such workers would have had every reason to expect that such a process would not be operable to produce recoverable pentafluoroiodoethane product. It is well known that $SbF_3Cl_2$ is a strong fluorinating agent relative to $HgF_2$ and $KF$ and that it has a stronger fluorinating activity in relation to other antimony halide fluorinating agents as shown by the following relationship:

$$SbF_3Cl_2 > SbF_3 + SbCl_3 > SbF_3$$

It is also well known that mono-iodides, and particularly mono-iodides of the formula $C_nF_{2n+1}I$, are substantially more reactive than the corresponding mono-chlorides and mono-bromides, and that as a result mono-iodides cannot generally be effectively prepared by methods used to prepare the counterpart mono-chlorides and mono-bromides. (See col. 1, U.S.P. 2,614,131 to Simons et al.) It is also common knowledge that a terminal iodine atom is easily replaced with a fluorine atom using $SbF_3Cl_2$ as fluorinating agent (see col. 7, U.S.P. 3,091,648 to Hauptschein et al.). Hence, although it is known that most all of the antimony containing fluorinating agents will react with $=CBr_2$, $-CBr_3$, $=CCl_2$ and $-CCl_3$ groupings to form $=CBrF$, $-CBrF_2$, $=CCIF$ and $-CClF_2$ groupings, respectively; due to the high reactivity of the mono-iodide, pentafluoroiodoethane, the high fluorinating activity of $SbF_3Cl_2$ and the reported ease with which terminal iodine atoms are replaced by fluorine with $SbF_3Cl_2$; it would have been expected that diiodotetraiodoethane would have reacted with $SbF_3Cl_2$ to form the perfluorinated product, perfluoroethane, and that the mono-iodide, pentafluoroiodoethane, could not be recovered. Contrary to expectation, we have found that this is not the case and that by the subject reaction, the mono-iodide can be prepared and recovered in reasonably good yields.

Thus, the invention consists of the discovery of a highly specific unexpected reaction, involving the choice of a specific iodine-containing, perhalogenated, aliphatic, saturated starting material; the choice of a specific fluorinating agent and the relation thereto of certain operating conditions of temperature necessary to give the desired results.

The fluorination reaction of the invention may be carried out by merely adding 1,2-diiodotetrafluoroethane to $SbF_3Cl_2$ at certain elevated temperatures.

The 1,2-diiodotetrafluoroethane starting material is a known compound and may be prepared by reacting tetrafluoroethylene with iodine as described in U.S.P. 2,424,667 to Raasch.

The $SbF_3Cl_2$ fluorinating reactant may be prepared and then added to the reaction vessel or, it may be prepared in the reaction vessel which is to be used for the fluorination reaction by a number of conventional methods, such as by contacting $SbF_3$ with chlorine at about 90° C.; reacting $SbCl_5$ with $HF$ until at least about 3 moles of $HCl$ per mole of $SbCl_5$ have evolved or by simply heating a mixture of $SbF_3$ and $SbCl_5$. In the latter case 1–4 moles of $SbF_3$ per mole of $SbCl_5$ should preferably be employed and still preferably about 2 moles of $SbF_3$ per mole of $SbCl_5$. Unreacted excesses of any of the reagents used in preparing the $SbF_3Cl_2$ fluorinating reactant will not deleteriously affect the reaction; although large excesses should be avoided for reasons of economy and to minimize purification and recovery procedures.

Reaction temperatures should be maintained between about 60–130° C. It is further surprising that elevated temperatures of this order are required to effectively replace a single iodine atom with fluorine without resulting in complete fluorination in view of the high reactivity of mono-iodides and $SbF_3Cl_2$. Indeed, temperatures substantially above this range do favor formation of the perfluorinated product, although not to the exclusion of the sought-for product, whereas temperatures substantially below this range are not effective in producing substantial yields and conversions of the sought-for pentafluoroiodoethane product. The preferred operating temperature range lies between about 80–110° C.

The 1,2-diiodotetrafluoroethane and $SbF_3Cl_2$ reactants can be contacted in almost any molar proportions; however, the reaction is most efficient when the stoichiometric molar proportion is employed. If an excess of 1,2-diiodotetrafluorethane is employed, conversions, of course, will be proportionately diminished. A small excess of $$SbF_3Cl_2$$

say 10% over the stoichiometric, may be employed to favor complete reaction of the organic material. Large excesses of $SbF_3Cl_2$ will not deleteriously affect the reaction.

The reaction may be conducted at superatmospheric pressures, however, this is not necessary, one of the advantages of the invention process being that it readily proceeds at atmospheric pressure thus obviating the need for expensive and bulky pressure equipment.

Recovery of pentafluoroiodoethane is effected by removing the same in gaseous state from the reaction vessel, as formed, by any conventional means, such as by flash distillation. The vaporous pentafluoroiodoethane product may then be condensed by cooling below its boiling point (13° C.) and further purified by distillation.

*Example 1*

Apparatus was a two liter flask, equipped with a reflux condenser, stirrer, thermometer, gas inlet dip tube and a Dry Ice cooled trap, connected to the reaction flask through a gas outlet tube. 239 g. (1.34 moles) of $SbF_3$ were charged to the flask following which chlorine gas was continuously passed into the flask and contents. The reaction flask contents were heated in contact with the chlorine gas at about 90° C. until all of the solid $SbF_3$ material disappeared. 276 g. (1.10 moles) of $SbF_3Cl_2$ were formed. Identification was confirmed by boiling point and infrared spectrum comparisons with those characteristics of the known material. The $SbF_3Cl_2$ thus formed was reheated in the same reaction flask to about 90° C., following which 354 g. (1.00 mole) of 1,2-diiodotetrafluoroethane were added over a period of about one hour. At the end of this time the reaction flask contents were heated to 110° C. A total of 219 g. of a slightly pinkish liquid was recovered from the Dry Ice trap. Distillation of this liquid gave 160 g. (0.650 mole) of pentafluoroiodoethane (B.P. 7–15° C., mostly at 13° C.) and 51.5 g. of 1-chloro-2-iodotetrafluoroethane (B.P. 54–55° C.). Based on starting material recovered, there was obtained a 65% yield of pentafluoroiodoethane. Identification of these products was made by boiling point and infrared spectrum comparisons wtih those characteristics of the known materials.

*Example 2*

To a three-necked 250 ml. flask, equipped with a reflux condenser, stirrer, thermometer, dropping funnel and gas outlet tube connected to a Dry Ice acetone cooled trap, were charged 50.0 g. (0.141 mole) of 1,2-diiodotetrafluoroethane (B.P. 113° C.) and 31.0 g. (0.170 mole) of $SbF_3$. The mixture was heated to 70° C. and reacted for a period of about two hours. No reaction took place during this period and the reaction mixture was cooled to 35° C. and 11 g. (0.04 mole) of $SbCl_5$ were added. The resulting mixture was heated to reflux temperature and after an additional two hours of heating, the reaction mixture was again cooled to about 35° C. and an additional 11 g. (0.04 mole) of $SbCl_5$ were added. The resulting mixture was refluxed overnight at the end of which time about 19 g. of low boiling material were recovered in the Dry Ice acetone trap. The contents of the reaction flask were extracted with diethyl ether to give 7 g. of an oily pink liquid. This liquid and the liquid recovered in the Dry Ice acetone trap were combined and then distilled to give 15 g. (0.061 mole) of pentafluoroiodoethane (B.P. 13° C.), 4 g. (0.02 mole) of 1-chloro-2-iodotetrafluoroethane (B.P. 56° C.) and 7 g. (0.02 mole) of unreacted 1,2-diiodotetrafluoroethane. Based on starting material recovered, there was obtained a 43% conversion and a 50% yield of pentafluoroiodoethane. Identification of the product and other distillation fractions was made by boiling point and infrared spectrum comparisons with those characteristics of the known materials.

We claim:

1. The process comprising reacting 1,2-diiodotetrafluoroethane with a fluorinating agent consisting essentially of $SbF_3Cl_2$, at temperatures in the range of about 60–130° C. and recovering pentafluoroiodoethane from the reaction mixture.

2. The process according to claim 1 which is carried out at temperatures in the range of about 80–110° C.

References Cited

UNITED STATES PATENTS 1,978,840 10/1934 Henne _____ 260—653.8
2,975,220 3/1961 Hauptschein et al. __ 260—653.1

LEON ZITVER, *Primary Examiner.*

DANIEL D. HORWITZ, *Examiner.*